United States Patent [19]

Jodlbauer

[11] Patent Number: 6,120,808
[45] Date of Patent: Sep. 19, 2000

[54] METHOD FOR MANUFACTURING A HOUSEHOLD FLOUR

[76] Inventor: Heinz D. Jodlbauer, Drostestrasse 2, D-30161 Hannover, Germany

[21] Appl. No.: 09/253,394

[22] Filed: Feb. 19, 1999

[30] Foreign Application Priority Data

Feb. 24, 1998 [DE] Germany .......................... 198 07 746

[51] Int. Cl.⁷ ................................. A21D 2/14; B02B 5/00
[52] U.S. Cl. ................................ 426/19; 426/44; 426/460
[58] Field of Search ............................ 426/18–20, 27–28, 426/44, 549, 551, 553, 555, 556, 463, 459, 496, 460, 622, 507; 241/6–8, 12

[56] References Cited

U.S. PATENT DOCUMENTS 3,851,085   11/1974   Rodgers et al. ........................ 426/626

OTHER PUBLICATIONS

Pyler, E. *Baker Science and Technology*, vol. I, Sosland Pub. Co., pp. 334–341, 348–351, 473–481, 1988.

Translation of Parts of Beneducket G u.a.: Die Bestandteile von Backmitteln, cover sheet, p.1, pp. 22–23, date unknown.

Translation of Bund fur Lebensmittelrecht und Lebensmittelkunde, BBV, B. Behr's Veriag, Hamburg, 1974, pp 11.

*Primary Examiner*—Keith D. Hendricks
*Attorney, Agent, or Firm*—Vidas, Arrest & Steinkraus, P.A.

[57] ABSTRACT

A method for manufacturing a household flour with improved baking properties, in particular for yeast-leavened bread, which mixes a first wheat flour with a second wheat flour, the second wheat flour being produced by softening wheat in aqueous surroundings wherein the wheat germinates; adding a liposome solution to the aqueous surroundings that the wheat is germinating in, the liposome solution penetrating the biomembranes of the wheat germ to enhance enzyme production; interrupting the germination phase after a predetermined time; drying the germinated material, and grinding the germinated material to produce the second wheat flour.

10 Claims, No Drawings

METHOD FOR MANUFACTURING A HOUSEHOLD FLOUR

BACKGROUND OF THE INVENTION

The invention relates to a method for manufacturing a household flour with improved baking properties.

If one observes the spectrum of baking goods made by the housewife, then it is apparent that for the most part only cakes, such as for example Madiera and sponge cakes as well as short-crust pastry are made. The number of yeast-leavened doughs is relatively small. The cause of this lies in the insufficient sureness of success for the housewife. With cakes for example, baking powder, a chemical leavening agent is used with a high sureness of success. With yeast-leavened doughs the yeast produces alcohol and $CO_2$ for loosening the dough, wherein the housewife has much less sureness of success, since the baking experience of the older housewife generations have not been transmitted to the younger generations to a sufficient degree. Thus the yeast doughs are much less successful than the cake or short-crust doughs. In the course of the decades a corresponding barrier has been built up. As alternatives cake or yeast dough ready mixtures have been offered.

By way of the improvement in the field of grinding by use of glutinous wheat or by special grinding passages an improvement has been sought sought to be made. A successful breakthrough was not made. Differing harvest qualities with the used types of wheat additionally have an effect on the uniformity of the quality of the housewive's flour. The level of the so-called fermentation tolerance remains middle to low.

BRIEF SUMMARY OF THE INVENTION

It is the object of the invention to specify a method for manufacturing a household flour with improved baking properties which is distinguished by the sureness of success.

The object is achieved by the invention disclosed herein.

DETAILED DESCRIPTION OF THE INVENTION

It is essential to the invention that a part of wheat or wheat flour with an enzyme profile is added to the conventional wheat or wheat flour, for example of the type 405. With this it is proceeded from the knowledge that it is possible to use the germ of the wheat, in particular the scutellum, together with the growing suction epithelium as a chemical reactor, in that an activation is effected by a certain substance. This substance is suited to penetrate biomembranes relatively easily and quickly: to this there belongs liposomes or niosomes. The wheat as with a conventional malting process is subjected to a softening and germination procedure in an aqueous surroundings. To the aqueous surroundings there is added the substance passing through the biomembrane which on the one hand leads to an increased activity of the seed inherent gibberellins and on the other hand the seed inherent conduit network is used, i.e. an increased transport of gibberellins to the aleuron layer and a return transport of reserve substances from the flour body to the germ. There arises a new formation of enzymes or enzyme complexes or an enrichment of certain enzymes such as for example alpha-amylase, lipoxigenase, etc. Simultaneously with the described procedure also a supressing of certain enzymes and exzyme complexes may take place. Liposomes may for example be made from lecithins or lecithin fractions, for example from a lecitin which mainly contains phosphatidylcholin (PC) or from a lecithin fraction of phosphatidylethanolamine and phosphatidylinositol (PE or PI). If niosomes are applied for this alkylpolyglycerinether together with cholesterin and diacetylphosphate may be used as a niosome former or a glcyero-lactyl-palmate. The vesicles of the used liposomes or niosomes are of a size in the order of 10 to 3000 nm, preferably 50 to 200 nm.

The liposomes or niosomes may be used loaded or unloaded. The loading is known per se. The loading may take place with lipophil, hydrophobe or hydrophil substances. Accordingly the loading takes place in the hull or in the inner space of the vesicule.

The treatment phase, i.e. the subjecting of the seedlings to water and to the activating substance takes place roughly in a time duration of 1 to 12 hours, wherein the softening phase takes place during 1 to 6 hours and the germination phase 2 to 10 days, preferably 3 to 4 days. The temperature prevailing in the germination phase is preferably controlled. Preferably a cooling takes place on account of the heat arising from the germination. After a pregiven duration which determines the enrichment with enzymes, the germination phase is interrupted. For this a shock freezing may be applied. After the completion of the germination phase the germination material is dried, wherein preferably freeze-drying is applied. The dried material, i.e. the green malt has after drying a water content of 0.5 to 15%, preferably 6%.

Subsequently the germination material is ground and during the grinding may be separated into a fraction rich in enzymes and proteins and a fraction poor in proteins and enzymes. This is effected for example by the known winnowing method.

Subsequently there is cited an example of a liposome solution, as may be applied for the treatment of wheat:

| | |
|---|---:|
| phospholipid fraction (with a phosphatidylcholin content of 40%) | 5.000 |
| water | 45.000 |
| | 50.000 |

For application the liposome solution is diluted as follows:

| | |
|---|---:|
| liposome solution | 50.000 |
| water | 100.000 |
| | 150.000 |

A further dilution may be effected according to the following example:

| | |
|---|---:|
| 1st dilution solution | 150.000 |
| water | 7,500.000 |
| | 7,655.000 |

With this example the end liposome solution contains 0.65% liposomes.

The above quoted numbers are percentages by weight. This also applied to the following examples.

Subsequently an example for the treatment of wheat with the above liposome solution over a duration of 1 to 12 hours is cited.

|  | kg |
| --- | --- |
| wheat | 3.000 |
| final liposome solution | 2.250 |
| total applied amount | 5.250 |
| ./. of liposome solution not taken up | 1.480 |
| total applied liposome solution | 2.250 |
| liposome solution taken up by the wheat | 1.770 |

Softening phase

Treatment Duration Between 1 to 6 Hours

|  |  |
| --- | --- |
| wheat and liposome | 4.770 |
| depending on the softening conditions up to 1.000 kg water for remoistening in the germination phase | 1.000 |
|  | 5.770 |

Germination Phase

Duration between 2 to 12 days, preferably by 3–4 days according to the desired enzyme profile. Temperature range between 10° C. to 25° C., preferably between 14° C. to 15° C. Germination conditions: usual germination boxes, but also drum malting systems may be used.

Cooling Phase

Cooling is extended over all three phases, wherein the desired pilot temperature for obtaining the desired enzyme profile is controlled via the cooled air quantity.

Freezing Phase

When the desired enzyme profile is reached in the germination material, the application of the freezing phase is effected for interruption of the germination phase at −10° C. to −40° C. preferably at −16° C. in the form of a shock frosting in order to prevent a further changing of the produced enzyme profile.

Drying Phase

The freezing phase is followed by the drying phase for the manufacture of stable dry products. With this, in order to prevent enzyme losses conventional kiln-drying is not applied but one of the most gentle drying methods, such as for example freeze drying is applied in order keep the formed enzymes in the dried material as much as possible. The freeze dried product is set to a water content of approx. 6%, preferably between 0.5 and 15%.

It has been shown that by way of the increase of cereal-inherent enzyme concentrations or the enzyme complexes present in the wheat, in the wheat flour the fermentation tolerance can be considerably improved. Furthermore considerable improvements may be achieved with the household flour with germ found on the market (trademark "Urkraft des Keimes") with which by the addition of stabilised, i.e. heated germ (for reasons of shelf life), also a certain volume and fermentation tolerance reduction for nutritional-physiological reasons must be accepted. These improvements concern the fermentation tolerance as well as the baking volume.

There are basically two possibilities for manufacturing the improved household flour. The one according to claim 1 assumes that "normal" wheat is ground, for example for grinding the wheat flour type 405 and on the other hand a wheat with the enzyme profile which is manufactured in the above manner. The obtained flours are then mixed in the desired ratio. Conventional wheat and wheat enriched with enzymes are mixed in the desired ratio and subsequently ground, for example by a so-called grind mill, as is known per se.

Subsequently a few examples are cited for wheat flour mixtures for the household flour according to the invention as well as for baking products in comparison to standard flours, and specifically on the one hand standard flour type 405 and on the other hand "Urkraft des Keimes" type 405.

TABLE 1

99.5 g of wheat flour of the type 405 + 0.5 g of treated wheat flour with an enzyme profile, mixed according to the conventional method:
In 0.5 g of treated wheat flour there are contained

| Alpha-amylase U/g TrS | Lipoxygenase, pH 9.0 U/g TrS |
| --- | --- |
| 611 | 3001 |

EXAMPLE 1

Baking results as a measure of the fermentation tolerance baked for 50 or 70 minutes.

| | Series A | | | |
| --- | --- | --- | --- | --- |
|  | Standard mixture type 405 cooked 50 minutes | Type 405 mixture with enzyme profile 50 minutes | Standard type 405 cooked 70 minutes | Type 405 mixture with enzyme profile 70 minutes |
| Mill 1 | | | | |
| Vol. (ml) | 875 | 930 | 950 | 1055 |
| Curvature of cake | good | good | somewhat flat | good |
| Mill 2 | | | | |
| Vol. (ml) | 890 | 945 | 1010 | 1030 |
| Curvature of cake | good | good | somewhat flat | good |

TABLE 2

97.5 g of wheat flour of the type 405 + 2 g of heat stabilised germs - mixed according to the conventional method - mixed with 0.5 g of treated wheat flour with the following enzyme profile
In 0.5 g of treated wheat flour there are contained

| Alpha-amylase U/g TrS | Lipoxygenase, pH 9.0 U/g TrS |
| --- | --- |
| 611 | 3001 |

EXAMPLE 2

Baking result as a measure of the fermentation tolerance baked over 50 or 70 minutes.

| | Series B | | | |
|---|---|---|---|---|
| | "Urkraft d. Keimes" type 405 50 minutes | "Urkraft d. Keimes" type 405 with enzyme profile 50 minutes | "Urkraft d. Keimes" type 405 70 minutes | "Urkraft d. Keimes" type 405 with enzyme prof. 70 minutes |
| Mill 1 | | | | |
| Vol. (ml) | 850 | 890 | 930 | 1015 |
| Curvature of cake | good | good | caved in | somewhat flat |
| Mill 2 | | | | |
| Vol. (ml) | 780 | 850 | 880 | 995 |
| Curvature of cake | good | good | caved in | somewhat flat |

TABLE 3

99.5 g of wheat flour of the type 405 + 0.5 g of treated wheat flour with enzyme profile, mixed according to the conventional method.
In 0.5 g of treated wheat flour there are contained

| Alpha-amylase U/g TrS | Lipogenase, pH 9.0 U/g TrS | Lecithinase C mmol/min/g |
|---|---|---|
| 305 | 1608 | 29 |

EXAMPLE 3

Baking results as a measure of the fermentation tolerance baked for 50 or 70 minutes.

| | Series C | | | |
|---|---|---|---|---|
| | Standard mixture type 405 cooked 50 minutes | Type 405 mixture with enzyme profile 50 minutes | Standard type 405 cooked 70 minutes | Type 405 mixture with enzyme profile 70 minutes |
| Mill 1 | | | | |
| Vol. (ml) | 860 | 900 | 990 | 1010 |
| Curvature of cake | good | good | somewhat flat | good |
| Mill 2 | | | | |
| Vol. (ml) | 855 | 935 | 895 | 1050 |
| Curvature of cake | good | still good | good | good |

The curvature of the cake serves apart from the volume, as a measure of the stability of the cake in the cooking or over cooking. The following formulations are used as a scale in the evaluation:

good: a good fermentation tolerance, no visible caving in of the curvature of the cake.

still good: middle fermentation tolerance, slightly visible caving in of the curvature of the cake.

somewhat flat: middle to weak fermentation tolerance, the curvature is flat, already the first weakness is showing, i.e. the caving in of the crust of the cake. The kitchen judgement of the housewife would be "the cake has slightly caved in".

caved in: weak to insufficient fermentation tolerance, the curvature has caved in, the crust of the cake is—very clearly visible—caved in. The kitchen judgement of the houswife would be "the cake was a failure".

As can be recognised the household flour according to the invention has an improved fermentation tolerance and also a better cake volume.

What is claimed is:

1. A method for manufacturing a household flour comprising the steps of:
   providing a predetermined quantity of a first wheat flour;
   providing a predetermined quantity of a second wheat flour;
   mixing the first and second wheat flour together;
   the second wheat four being produced comprising the steps of:
      softening wheat in aqueous surroundings wherein the wheat germinates;
      adding a liposome solution to the aqueous surroundings that the wheat is germinating in, the liposome solution penetrating the biomembranes of the wheat germ to enhance enzyme production;
      interrupting the germination phase after a predetermined time;
      drying the germinated material, and
      grinding the germinated material to produce the second wheat flour.

2. A method for manufacturing a household flour comprising the steps of:
   providing a predetermined quantity of a first wheat flour;
   providing a predetermined quantity of a second wheat flour;
   mixing the first and second wheat flour together;
   the second wheat flour being produced comprising the steps of:
      softening wheat in aqueous surroundings wherein the wheat germinates;
      adding a niosome solution to the aqueous surroundings that the wheat is germinating in, the niosome solution penetrating the biomembranes of the wheat germ to enhance enzyme production;
      interrupting the germination phase after a predetermined time;
      drying the germinated material, and
      grinding the germinated material to produce the second wheat flour.

3. A method for manufacturing a household flour comprising the steps of:
   providing a predetermined quantity of a first wheat;
   providing a predetermined quantity of a second wheat;
   grinding the first and second wheat together to produce wheat flour;
   the second wheat being produced comprising the steps of:
      softening wheat in aqueous surroundings wherein the wheat germinates;
      adding a liposome solution to the aqueous surroundings that the wheat is germinating in, the liposome solution penetrating the biomembranes of the wheat germ to enhance enzyme production;
      interrupting the germination phase after a predetermined time;
      drying the germinated material to produce the second wheat.

4. A method for manufacturing a household flour comprising the steps of:
   providing a predetermined quantity of a first wheat;
   providing a predetermined quantity of a second wheat;

grinding the first and second wheat together to produce wheat flour;

the second wheat being produced comprising the steps of:
  softening wheat in aqueous surroundings wherein the wheat germinates;
  adding a niosome solution to the aqueous surroundings that the wheat is germinating in, the niosome solution penetrating the biomembranes of the wheat germ to enhance enzyme production;
  interrupting the germination phase after a predetermined time;
  drying the germinated material to produce the second wheat.

5. A method according to claim 1, wherein the second wheat flour is added to the first flour in a part of 0.5 to 10%.

6. A method according to claim 1, wherein the first wheat flour is type 405.

7. A method according to claim 3, wherein the second wheat is added to the first wheat in a part of 0.5 to 10%.

8. A method according to claim 3, wherein the first wheat is type 405.

9. A method according to claim 5, wherein the first wheat is type 405.

10. A method according to claim 7, wherein the first wheat is type 405.

* * * * *